July 20, 1943.　　　R. L. SMIRL　　　2,324,733
TRANSMISSION
Filed Dec. 2, 1940
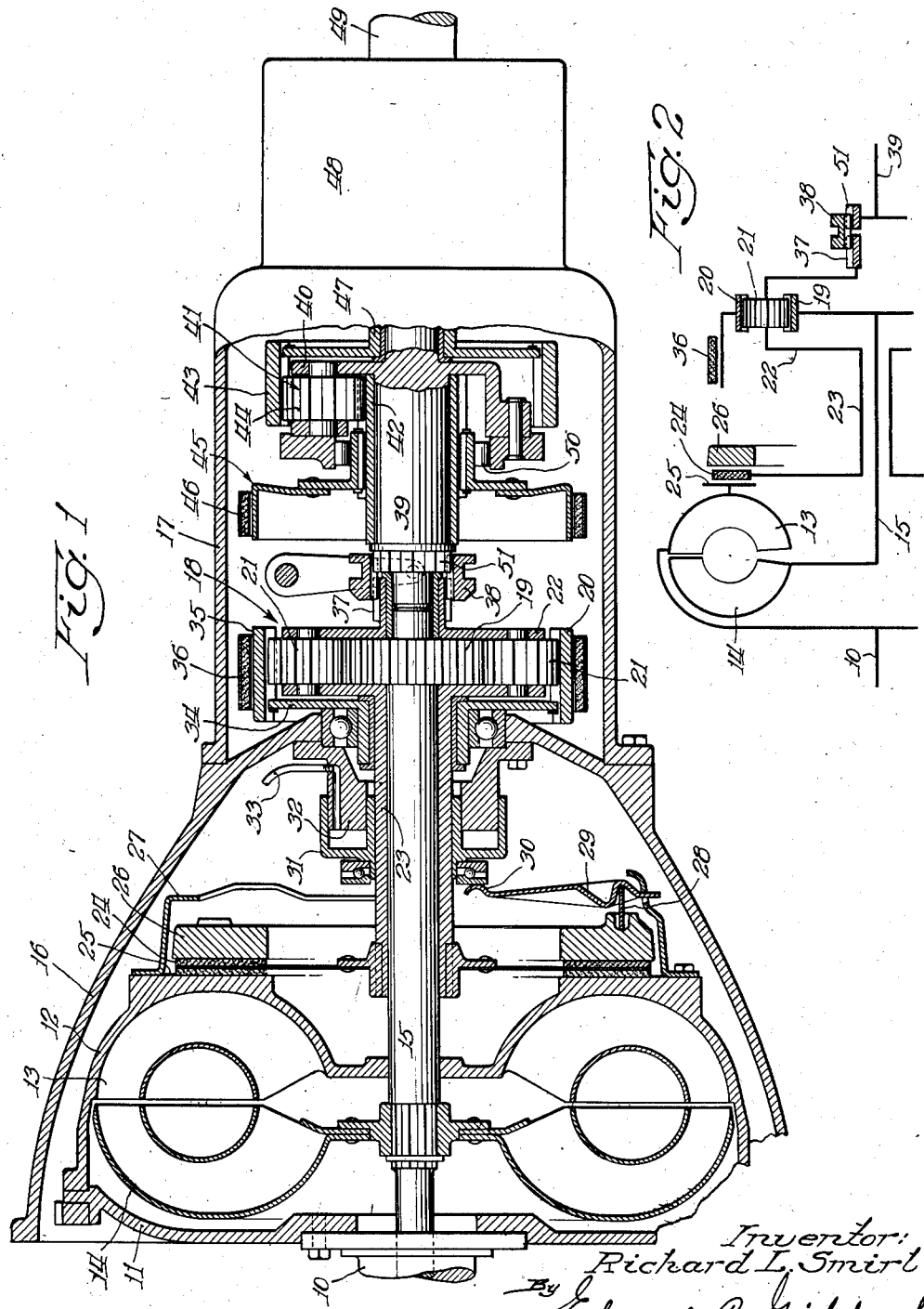
Inventor:
Richard L. Smirl
By Edward C. Gritzbaugh
Atty.

Patented July 20, 1943

2,324,733

UNITED STATES PATENT OFFICE

2,324,733

TRANSMISSION

Richard L. Smirl, Bellwood, Ill., assignor to Borg-Warner Corporation, Chicago, Ill., a corporation of Illinois Application December 2, 1940, Serial No. 368,120

5 Claims. (Cl. 74—189.5)

This invention relates to a power transmitting device, and particularly to a device having a transmitting means which ordinarily is not completely releasable, such as a fluid coupled unit, combined with gearing.

It has been proposed to use fluid-coupled devices of the Foettinger type, either with or without a torque multiplying element therein, for the transmission of power from a low starting torque engine, such as the ordinary automobile engine, to the load. When such devices are used between the engine and propeller shaft of an automobile, due consideration must be given to the lower efficiencies which such devices provide, particularly at speeds at which the engine is operated the greater part of the time. This is true not only because of the loss in power involved, but also because of the increase in heat which results from the inefficiency.

The object of this invention is to provide a transmission having a fluid-coupled unit combined with gearing in such a way that at speeds corresponding to direct drive, the transmission will have the same efficiency as the ordinary three-speed and friction clutch transmission.

Another object of this invention is to provide a transmission of the type using an incompletely releasable unit wherein a mechanical drive is secured between the driving and driven shafts of the transmission without disconnecting the driving element of the incompletely releasable power transmitting unit from the drive shaft and without positively driving the driven element of the unit.

These and other objects of the invention will become apparent as the description proceeds. Forming part of the description is the accompanying drawing in which:

Fig. 1 is a side elevation, partly in section, of a transmission embodying my invention; and Fig. 2 is a schematic diagram of Fig. 1 which brings out more clearly the connections between the driving and driven shafts.

Referring now to the drawing for a detailed description of the invention, 10 is the crank shaft of an engine which also constitutes the drive shaft of the transmission. Said drive shaft 10 is connected to a housing 11 in one portion 12 of which is formed a series of vanes 13 which constitute the pump or impeller member of a fluid coupling of the Foettinger type. A driven vaned member or runner 14 is positioned opposite the vanes 13 of the impeller and completes a toroidal circuit for operating fluid which substantially fills housing 11. Runner 14 is splined to an intermediate shaft 15 which passes rearwardly (to the right in Fig. 1) through bell housing 16 and into a gear housing 17.

Within gear housing 17 is a planetary gear set designated generally by reference character 18 and comprising a sun gear 19, an internal ring gear 20, and intermediate planet pinions 21 which mesh with sun gear 19 and ring gear 20. Said pinions 21 are supported by a carrier member 22 which is drivingly connected to a hollow shaft 23 in a bell housing 16. The forward end of hollow shaft 23 is splined to a friction disc 24 of the type commonly employed in friction clutches for automobiles. Said disc 24 is positioned between a friction surface 25, which is machined on the rear of housing member 12, and a pressure plate 26 suitably supported in, and driven by, a clutch housing 27 secured to and rotatable with impeller housing 12. Pressure plate 26 is normally spaced slightly from driven disc 24 so as to allow relative rotation between these two members. Struts 28 and fingers 29 cooperate with housing 27 and pressure plate 26 to move pressure plate 26 against driven disc 24 to drive said driven disc 24 with housing 12. The inner ends 30 of fingers 29 are controlled in the form illustrated, by a movable cylinder 31 surrounding hollow shaft 23 and containing an annular fixed piston 32. Suitable fluid under pressure may be admitted through a conduit 33 into cylinder 31 to urge said cylinder to the left (Fig. 1), thereby acting upon fingers 29 and struts 28 to engage the clutch formed by pressure plate 26, driven disc 24 and friction surface 25.

Ring gear 20 is supported upon a plate 34, which is normally free to rotate about hollow shaft 23. The outer surface 35 of ring gear 20 is machined to form a brake drum with which cooperates a brake band 36. When brake band 36 is applied, the rotation of ring gear 20 is arrested, and either sun gear 19 or planet pinion 21 may be driven to produce a change in speed ratio. The manner of using brake band 36 will be described hereinafter.

The rear of carrier 22 is formed with external teeth 37 which mesh with an internally toothed slidable collar 38 and form therewith two elements of a jaw clutch. Mounted coaxially with respect to carrier 22 is a stub shaft 39 which is connected drivingly to the carrier 40 of a second planetary gear set 41. Said planetary gear set 41 comprises a long sun gear 42 rotatably mounted on stub shaft 39, an internally toothed ring gear 43 and planet pinions 44, the latter being mounted on carrier 40. The forward portion of the teeth of sun gear 42 form splines for fixing thereon a brake drum 45. Said drum 45 is provided with a brake band 46 by which the drum may be held against rotation when desired. Ring gear 43 is drivingly connected to a driven element 47 which in turn is connected to a suitable reversing mechanism 48, and thence to driven shaft 49.

The forward end of carrier 40 is connected to drum 45 through an overrunning clutch 50 of the roller and cam type, or the like, which is so arranged as to permit carrier 40 to rotate ahead of sun gear 42, but to prevent sun gear 42 from rotating ahead of the carrier.

It will be observed that planetary gear sets 18 and 41 constitute a double speed changing gear which is capable of producing at least three speeds forward. These three speeds may be the equivalent of the three speeds obtainable from an ordinary manually controlled transmission, or they may be a compromise with a high speed differential, that is, a differential having a lesser speed reduction, to produce an overall top ratio of about 3.5:1. Thus, if sun gear 19 is the drive gear, ring gear 35 is held by means of brake band 36, brake band 46 is released, and carrier 40 is driven through stub shaft 39 from clutch teeth 37, 38 and 51, planetary gear set 18 will act as a speed reducer and planetary gear set 41 will act as a simple clutch to give a low speed drive.

To obtain the next higher ratio through the gear set, brake band 36 is released and clutch disc 24 is engaged between pressure plate 26 and friction surface 25 to drive carrier 22 at the same speed as drive shaft 10 and its associated impeller member 13. This in effect connects clutch teeth 37 directly with drive shaft 10, and eliminates the speed reduction previously had through the gear set. The next higher speed, in this case the top speed, is obtained by operating brake 46 to arrest the rotation of sun gear 42 in planetary gear set 41 with carrier 22 still connected to the drive shaft as before.

A positive neutral is obtained by releasing clutch disc 24 and brake band 36 and then disengaging the teeth of collar 38 from teeth 51 in stub shaft 39.

An important feature of this invention resides in the fact that the efficiency of a mechanical drive between the engine and propeller shafts may be secured without the necessity of mechanically linking together the driving and driven elements of the hydraulic unit. As will be seen more clearly in Fig. 2, the engaging of friction clutch 24, 25, 26 and jaw clutch 37, 38, 51, with brake band 36 released, couples in effect, drive shaft 10 with stub shaft 39 and causes runner 14, intermediate shaft 15, and sun gear 19 to float without in any way participating in the transmission of power from drive shaft 10 to stub shaft 39. Although impeller 13 and runner 14 may be coupled hydraulically by reason of the rotation of impeller 13, the fluid does no work other than to overcome the force of friction acting upon the parts rotating with runner 14 and upon ring gear 20.

Another important feature of this invention is the means for eliminating drag torque on clutch teeth 37 so as to permit the engagement and release of collar 38 with teeth 51 without clash and without the use of special devices such as a rocking brake, etc. When the engine is idling, the drag torque on runner 14 is dissipated by the release of brake band 36, which permits ring gear 20 to rotate freely. Clutch 24, 25, 26 is, of course, released when the positive clutch 37, 38, 51 is to be operated. Since the drag torque is dissipated, planet carrier 22 will remain substantially stationary and can be readily rotated by the teeth on collar 38 to cause said teeth to become aligned with teeth 51, assuming that the cooperating ends of the teeth are rounded off or chamfered in the usual fashion to permit this operation.

Although this invention has been described with reference to a transmission employing an overdrive type of speed changing device, I wish it to be understood that the invention is adaptable to other forms of speed changing devices as well, and that the overdrive type is used here merely for illustrative purposes. It should be understood also that as to that portion of the device included between shaft 10 and stub shaft 39 the arrangement is merely illustrative and the scope of the invention, therefore, should not be limited thereto but should be determined by the appended claims. This invention is applicable generally to any power transmitting device which possess the characteristic of transmitting torque as a function of its speed of rotation so that at speeds corresponding to the idling speed of a gasoline engine the drive through the device is not completely released. Thus, electric drives as well as piston and other types of fluid drives are intended to come within the scope of the appended claims.

I claim:

1. A transmission comprising a driving shaft, a driven shaft, a hydraulic coupling having a runner and an impeller, said impeller being connected to rotate with said driving shaft, a planetary gear set including planet pinions, a carrier for said pinions, a sun gear meshing with said pinions and a ring gear likewise meshing with said pinions, a shaft connecting said sun gear with said runner, a brake for said ring gear, a clutch for connecting said carrier with said impeller, and a clutch for connecting directly said carrier and said driven shaft, the transmission providing with said last named clutch engaged and when said brake is engaged and said first named clutch is disengaged a hydraulically driven low gear drive between said shafts and when said brake is disengaged and said first named clutch is engaged a direct mechanical drive between said shafts to rotate the driven shaft independently of said runner and sun gear.

2. A transmission comprising a driving shaft, a driven shaft, a drive unit having a drive portion connected to said driving shaft, said unit possessing the characteristic of transmitting torque as a function of the speed of the drive portion, a driven portion in said unit, change speed mechanism of the planetary type connectible between said driven portion and said driven shaft, and a make and break connection for connecting one of the elements of said change speed mechanism with said drive portion whereby the element may be driven at a one-to-one ratio with respect to the drive portion, said last-named element being connected directly with said driven shaft whereby the shaft rotates at a one-to-one ratio with respect to said element and whereby the driven shaft rotates at a one-to-one ratio with respect to the driving shaft when said make and break connection is engaged.

3. A transmission comprising a driving shaft, a driven shaft, a hydrodynamic power transmitting device having a runner and an impeller, said impeller being connected to rotate with said driving shaft, a sun gear element, a ring gear element, a planet gear, a planet carrier element, said elements and said planet gear forming a change speed mechanism, one of said elements being connected directly with said driven shaft whereby the shaft rotates at a one-to-one ratio with respect to the element, another of said elements being connected with said runner to rotate therewith, braking means for releasably holding the other of said elements to make the element a reaction element, and a clutch for connecting said one of said elements to said impeller whereby the element may be driven at a one-to-one ratio with respect to the impeller, said one of said elements and said clutch providing when said reaction element is released a mechanical drive between said shafts to rotate the driven shaft at a one-to-one ratio with respect to the driving shaft and independently of said runner.

4. A transmission comprising a driving shaft, a driven shaft, a hydrodynamic power transmitting device having a runner and an impeller, said impeller being connected to rotate with said driving shaft, planetary gearing including a planet carrier and a sun gear, said carrier being connected directly with said driven shaft whereby the driven shaft rotates at a one-to-one ratio with respect to the carrier, said sun gear being connected to rotate with said runner, and a clutch for connecting said carrier with said impeller whereby the carrier may be driven at a one-to-one ratio with respect to the impeller, said clutch and said carrier providing a mechanical drive between said shafts to rotate the driven shaft at a one-to-one ratio with respect to the driving shaft and independently of said runner and sun gear.

5. A transmission comprising a driving shaft, a driven shaft, a hydrodynamic coupling having a runner and an impeller, said impeller being connected to rotate with said driving shaft, a planetary gear set including planet pinions, a carrier for said pinions, a sun gear meshing with said pinions and a ring gear likewise meshing with said pinions, said sun gear being connected to rotate with said runner, a brake for said ring gear, and a clutch for connecting said carrier with said impeller whereby the carrier may be driven at a one-to-one ratio with respect to the impeller, said carrier being connected directly with said driven shaft whereby the shaft rotates at a one-to-one ratio with respect to the carrier, said coupling and planetary gear set providing when said brake is effective and said clutch is released a hydraulically driven low gear drive between said shafts, said clutch and said carrier providing when the clutch is engaged and said brake is released a direct mechanical drive between said shafts to rotate the driven shaft independently of said runner and sun gear and at a one-to-one ratio with respect to the driving shaft.

RICHARD L. SMIRL.